(12) United States Patent
Desille

(10) Patent No.: US 9,951,214 B2
(45) Date of Patent: Apr. 24, 2018

(54) COATED ARTICLE

(71) Applicant: TOTAL RESEARCH & TECHNOLOGY FELUY, Seneffe (BE)

(72) Inventor: Gabriel Desille, Nivelles (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 201 days.

(21) Appl. No.: 14/771,756

(22) PCT Filed: Mar. 4, 2014

(86) PCT No.: PCT/EP2014/054182
§ 371 (c)(1),
(2) Date: Aug. 31, 2015

(87) PCT Pub. No.: WO2014/135543
PCT Pub. Date: Sep. 12, 2014

(65) Prior Publication Data
US 2016/0017134 A1   Jan. 21, 2016

(30) Foreign Application Priority Data

Mar. 5, 2013 (EP) .................................... 13157839

(51) Int. Cl.
| | |
|---|---|
| *B32B 27/32* | (2006.01) |
| *B32B 27/36* | (2006.01) |
| *B32B 27/20* | (2006.01) |
| *B32B 27/18* | (2006.01) |
| *B32B 7/04* | (2006.01) |
| *B05D 7/04* | (2006.01) |
| *C08L 23/12* | (2006.01) |
| *B29C 45/00* | (2006.01) |
| *C08L 23/06* | (2006.01) |
| *C08L 67/04* | (2006.01) |
| *B29K 67/00* | (2006.01) |
| *B29K 105/00* | (2006.01) |

(52) U.S. Cl.
CPC .......... *C08L 23/12* (2013.01); *B29C 45/0001* (2013.01); *B29K 2067/046* (2013.01); *B29K 2105/0088* (2013.01); *B29K 2223/10* (2013.01); *C08L 2205/035* (2013.01); *C08L 2205/08* (2013.01); *C08L 2207/02* (2013.01)

(58) Field of Classification Search
None
See application file for complete search history.

(56) References Cited

U.S. PATENT DOCUMENTS

| | | | |
|---|---|---|---|
| 2009/0326152 A1 | 12/2009 | Li et al. | |
| 2010/0113734 A1 | 5/2010 | Dubois et al. | |
| 2011/0190447 A1 | 8/2011 | Li et al. | |
| 2011/0213087 A1* | 9/2011 | Coupin ................. | C08F 255/02 525/190 |
| 2012/0080822 A1* | 4/2012 | Li .......................... | C08L 23/10 264/328.17 |

FOREIGN PATENT DOCUMENTS

| | | | | |
|---|---|---|---|---|
| JP | 2009-263660 A | * | 11/2009 | ............ C08L 101/00 |
| KR | 10-2012-0128732 A | * | 11/2012 | ............ C08L 67/04 |

OTHER PUBLICATIONS

Machine translation of KR 10-2012-0128732 A, provided by the KIPO website (no date).*
Machine translation of JP 2009-263660 A, provided by the JPO website (no date).*
International Search Report issued in PCT/EP2014/054182, dated Apr. 3, 2014, 3 pages.

* cited by examiner

*Primary Examiner* — Michael J Feely
(74) *Attorney, Agent, or Firm* — Albert Shung

(57) ABSTRACT

An article is provided that includes a blend. The blend includes from at least 5.0% to at most 20.0% by weight of polylactic acid (PLA), based on the total weight of the blend; at least 5.0% to at most 92.0% by weight of polypropylene (PP) or of a mixture of polypropylene (PP) and polyethylene (PE), based on the total weight of the blend; from 0.0% to at most 40.0% by weight of an inorganic filler, based on the total weight of the blend; at least 0.1% to at most 10.0% by weight of a compatibilizer, based on the total weight of the blend; and at least 0.1% to at most 40.0% by weight of an elastomer, based on the total weight of the blend. The elastomer is ethylene octene rubber or ethylene butene monomer rubber. The article is at least partially coated with at least one coating.

16 Claims, 1 Drawing Sheet

| Classification | Description | Surface of the cross hatched area for which flaking has occurred (For six parallel incisions) |
|---|---|---|
| a | The edges of the incisions are perfectly smooth : none of the squares on the cross hatched area has become detached. | - |
| b | Detachment of small flakes from the coating at the incision intersections affecting approximately 5% of the cross hatched area. |  |
| c | The coating has become detached along the edges and/or at the incision intersections affecting clearly over 5% up to approximately 15% of the cross hatched area. |  |
| d | The coating has become detached along the edges of the incisions partially or totally, in large strips, and/or has become detached partially or totally in various points of the cross hatched area. A cross hatched area representing clearly over 15% up to 35% is affected. |  |
| e | The coating has become detached along the edges of the incisions in large strips and/or a few squares have become detached partially or totally. An area representing clearly over 35% up to 65% is affected. |  |
| > e | All degrees of flaking which cannot be classified under classification e. | - |

COATED ARTICLE

CROSS-REFERENCE TO RELATED APPLICATIONS

The present application is a National Stage Entry of PCT/EP2014/054182, filed on Mar. 4, 2017, which claims priority from EP 13157839.5 filed Mar. 5, 2013, the entireties of which are incorporated herein by reference.

FIELD OF THE INVENTION

The present invention relates to an at least partially coated article. The present invention also relates to a process for forming an at least partially coated article.

BACKGROUND OF THE INVENTION

Polyolefins, such as polypropylene (PP) and polyethylene (PE), are plastics that are difficult to coat. The problem is bad adhesion due to low surface tension in combination with the evaporation of paraffin. Flame treating is often used to improve the wetting and adhesion properties of polymer surfaces in general and of polyolefin surfaces in particular. The enhanced wetting property results in improved coatability and adhesion of materials such as pressure-sensitive adhesives, primers and low-adhesion release coatings.

Flame treaters ordinarily use premixed flames, i.e., the fuel and oxidizer are thoroughly mixed prior to combustion and the rate of combustion is controlled by the rate of chemical reaction that occurs in the flame. In a premixed flame, the luminous region is that portion of the flame where the rise in temperature is the greatest and where much of the reaction and heat release occurs. During a flame-treating process, one side of a polymer article is passed in close proximity to a flame, while the other side of the polymer surface may pass over a cooled support, e.g., a cooled drum, to minimize heat distortion.

Flames are commonly described in terms of two characteristics: the flame power and the molar ratio of oxidizer to fuel. The flame power is the product of the volume of fuel burned per unit time and the heat content of the fuel. Typical units for the flame power are W or Btu/hr. In flame treating, the flame power can be normalized to account for the dimensions of the burner, leading to units such as $W/cm^2$ or $Btu/hr\text{-}in^2$.

The exact ratio of oxidizer to fuel needed for complete combustion is known as the stoichiometric ratio. For example, the exact amount of dry air necessary for the complete combustion of methane is 9.55 volumes per volume of methane; so the stoichiometric ratio for an air:methane flame is 9.55:1. The equivalence ratio is defined as the stoichiometric oxidizer:fuel ratio divided by the actual oxidizer:fuel ratio. For fuel-lean (or oxidizing) flames, there is more than the stoichiometric amount of oxidizer and so the equivalence ratio is less than one. For oxidizer:fuel mixtures at the stoichiometric ratio, the equivalence ratio is equal to one. For fuel-rich systems, the equivalence ratio is greater than one.

Virtually all industrial flame treaters use a premixed laminar (as opposed to turbulent) flame with air as the oxidizer and a gaseous hydrocarbon as a fuel. Typical hydrocarbon fuels comprise hydrogen, natural gas, methane, ethane, propane, butane, ethylene, liquefied petroleum gas, acetylene, or blends thereof, and city gas, which is often composed of a mixture of carbon dioxide, carbon monoxide, hydrogen, methane, and nitrogen. Halogen and halogen-containing compounds have also been disclosed as oxidizer:fuel mixture additives to increase the adhesivity of polyolefin articles to subsequent coatings. The flaming step is usually automated.

However, flame treating a polymeric article can take a long time and can be expensive. It can also induce process variabilities, which in turn can lead to a higher rate of defective parts. In addition, the flaming process can generate design constraints, because parts have to be treated homogeneously.

SUMMARY OF THE INVENTION

It is therefore an object of the present invention to provide an at least partially coated article that can be produced more quickly, and with improved mechanical properties and improved adhesion of the coating on the article. It is also an object of the present invention to provide an at least partially coated article that can be produced more reliably. It is also an object of the present invention to provide an at least partially coated article that can be produced with less design constraints. It is also an object of the present invention to provide a process for forming an at least partially coated article more quickly, with improved mechanical properties and with improved adhesion of the coating on the article. It is also an object of the present invention to provide a process for forming an at least partially coated article more reliably. It is also an object of the present invention to provide a process for forming an at least partially coated article with less design constraints, with improved mechanical properties and with improved adhesion of the coating on the article.

The inventors have now discovered that these objects can be met either individually or in any combination by the present articles, products and processes. The inventors have surprisingly found that combining (i) polylactic acid with (ii) polypropylene or a mixture of polypropylene and polyethylene and (iii) at least one compatibilizer, and preferably at least one elastomer, preferably at certain concentrations, allows the preparation of article presenting improved mechanical and adhesion properties. This allows to reduce (or even to fully remove) the flaming step when producing an at least partially coated article, resulting in a much more efficient process, both cost wise and time wise.

According to a first aspect of the invention, an article is provided, wherein the article comprises a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend; and
at least 0.1% to at most 10.0% by weight of a compatibilizer, based on the total weight of the blend;
wherein said article is at least partially coated with at least one coating. Preferably, said article is not-flamed (unflamed) prior to being coated.

Preferably, an article is provided, wherein the article comprises a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend;

at least 0.1% to at most 10.0% by weight of a compatibilizer, based on the total weight of the blend; and
at least 0.1% to at most 40.0% by weight of an elastomer, based on the total weight of the blend, wherein the elastomer is selected from the group comprising ethylene octene rubber and ethylene butene monomer rubber;
wherein said article is at least partially coated with at least one coating. Preferably, said article is not-flamed (unflamed) prior to being coated.

According to a second aspect of the invention, an article is provided obtainable by a process comprising the steps of:
preparing a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend; and
at least 0.1% to at most 10.0% by weight of a compatibilizer, based on the total weight of the blend;
molding the blend into an article; and
at least partially coating the article with at least one coating.

Preferably, an article is provided obtainable by a process comprising the steps of:
preparing a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend;
at least 0.1% to at most 10.0% by weight of a compatibilizer, based on the total weight of the blend; and
at least 0.1% to at most 40.0% by weight of an elastomer, based on the total weight of the blend, wherein the elastomer is selected from the group comprising ethylene octene rubber and ethylene butene monomer rubber;
molding the blend into an article; and
at least partially coating the article with at least one coating.

According to a third aspect, the invention provides a vehicle comprising the article according to the first or second aspect of the invention.

According to a fourth aspect, the invention provides a process of forming an article, the process comprising the steps of:
preparing a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend; and
at least 0.1% to at most 10.0% by weight of a compatibilizer, based on the total weight of the blend;
molding the blend into an article; and
at least partially coating the article with at least one coating.

Preferably, the invention provides a process of forming an article, the process comprising the steps of:
preparing a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend;
at least 0.1% to at most 10.0% by weight of a compatibilizer, based on the total weight of the blend; and
at least 0.1% to at most 40.0% by weight of an elastomer, based on the total weight of the blend, wherein the elastomer is selected from the group comprising ethylene octene rubber and ethylene butene monomer rubber;
molding the blend into an article; and
at least partially coating the article with at least one coating.

Preferably, the article according to the first or second aspect of the invention is formed through a process according to the fourth aspect of the invention.

The independent and dependent claims set out particular and preferred features of the invention. Features from the dependent claims may be combined with features of the independent or other dependent claims as appropriate.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

BRIEF DESCRIPTION OF THE FIGURES

FIG. 1 represents a table showing characterization codes for the adhesion test used in the example section.

DETAILED DESCRIPTION OF THE INVENTION

Before the present articles and processes of the invention are described, it is to be understood that this invention is not limited to particular articles and processes described, since such articles and processes may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. By way of example, "an article" means one article or more than one article.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

As used herein, the term "alkyl" by itself or as part of another substituent, refers to a straight or branched saturated hydrocarbon radical group joined by single carbon-carbon bonds having 1 or more carbon atoms, for example 1 to 20 carbon atoms, for example 1 to 12 carbon atoms, for example 1 to 6 carbon atoms, for example 1 to 4 carbon atoms, for example 2 to 3 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of $C_{1-12}$alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Any alkyl may be substituted with one or more halogen atoms. Exemplary halogen atoms include chlorine, bromine, fluorine and iodine and of these halogen atoms, fluorine and chlorine are preferred.

As used herein, the term "aryl", by itself or as part of another substituent, refers to a polyunsaturated, aromatic hydrocarbyl group having a single ring (i.e. phenyl) or multiple aromatic rings fused together (e.g. naphthalene), or linked covalently, typically containing 6 to 20 carbon atoms (referred to as "$C_{6-20}$aryl"); wherein at least one ring is aromatic. Examples of $C_{6-20}$aryl include phenyl, naphthyl, indanyl, biphenyl, or 1,2,3,4-tetrahydro-naphthyl. Any alkyl may be substituted with one or more halogen atoms. Exemplary halogen atoms include chlorine, bromine, fluorine and iodine and of these halogen atoms, fluorine and chlorine are preferred.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—$CH(CH_3)$—$CH_2$—$CH_2$—), 4-methylbutylene (—$CH_2$—$CH_2$—$CH_2$—$CH(CH_3)$—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers.

As used herein, the term "arylene", by itself or as part of another substituent, refers to aryl groups that are divalent, i.e., with two single bonds for attachment to two other groups.

All references cited in the present specification are hereby incorporated by reference in their entirety. In particular, the teachings of all references herein specifically referred to are incorporated by reference.

According to a first aspect, the invention relates to an article, wherein the article comprises a blend comprising:
  at least 5.0% to at most 20.0% by weight of polylactic acid, based on the total weight of the blend;
  at least 5.0% to at most 92.0% by weight of polypropylene or of a mixture of polypropylene and polyethylene, based on the total weight of the blend;
  from 0.0% to at most 40.0% by weight of an inorganic filler, based on the total weight of the blend; and
  at least 0.1% to at most 10.0% by weight of a compatibilizer, based on the total weight of the blend;
wherein said article is at least partially coated with at least one coating.

Preferably, the blend comprises an elastomer, for example at least 0.1% to at most 40.0% by weight of an elastomer based on the total weight of the blend; for example at least 1.0% to at most 40.0% by weight of an elastomer, for example at least 1.0% to at most 30.0% by weight of an elastomer, for example at least 1.0% to at most 25.0% by weight of an elastomer, for example at least 5.0% to at most 40.0% by weight of an elastomer, for example at least 5.0% to at most 35.0% by weight of an elastomer, for example at least 5.0% to at most 30.0% by weight of an elastomer, preferably at least 5.0% and at most 25.0% by weight of an elastomer, for example at least 6.0% to at most 40.0% by weight of an elastomer, for example at least 6.0% to at most 35.0% by weight of an elastomer, for example at least 6.0% to at most 30.0% by weight of an elastomer, preferably at least 6.0% and at most 25.0% by weight of an elastomer, based on the total weight of the blend, for example at least 7.0% to at most 40.0% by weight of an elastomer, for example at least 7.0% to at most 35.0% by weight of an elastomer, for example at least 7.0% to at most 30.0% by weight of an elastomer, preferably at least 7.0% and at most 25.0% by weight of an elastomer, based on the total weight of the blend; preferably at least 8.0% to at most 40.0% by weight of an elastomer, for example at least 8.0% to at most 35.0% by weight of an elastomer, for example at least 8.0% to at most 30.0% by weight of an elastomer, preferably at least 8.0% and at most 25.0% by weight of an elastomer, based on the total weight of the blend; preferably at least 9.0% to at most 40.0% by weight of an elastomer, for example at least 9.0% to at most 35.0% by weight of an elastomer, for example at least 9.0% to at most 30.0% by weight of an elastomer, preferably at least 9.0% and at most 25.0% by weight of an elastomer, based on the total weight of the blend; for example at least 10.0% to at most 40.0% by weight of an elastomer, for example at least 10.0% to at most 35.0% by weight of an elastomer, for example at least 10.0% to at most 30.0% by weight of an elastomer, preferably at least 10.0% and at most 25.0% by weight of an elastomer, based on the total weight of the blend; for example at least 11.0% to at most 40.0% by weight of an elastomer, for example at least 11.0% to at most 35.0% by weight of an elastomer, for example at least 11.0% to at most 30.0% by weight of an elastomer, preferably at least 11.0% and at most 25.0% by weight of an elastomer, based on the total weight of the blend. Preferably the elastomer is selected from the group comprising ethylene octene rubber (EOR), ethylene butene monomer rubber (EBM), and mixture thereof.

Preferably, said article is at least partially coated by a coating in direct contact with the blend.

Preferably, the article is an injection-molded article.

According to a second aspect, the invention provides an article obtainable by a process comprising the steps of:
  preparing a blend comprising:
    at least 5.0% to at most 20.0% by weight of polylactic acid, based on the total weight of the blend;
    at least 5.0% to at most 92.0% by weight of polypropylene or of a mixture of polypropylene and polyethylene, based on the total weight of the blend;

from 0.0% to at most 40.0% by weight of an inorganic filler, based on the total weight of the blend; and
at least 0.1% to at most 10.0% by weight of a compatibilizer, based on the total weight of the blend;
molding the blend into an article; and
at least partially coating the article with at least one coating; preferably, the blend comprises an elastomer, for example at least 0.1% to at most 40.0% by weight of an elastomer based on the total weight of the blend; for example at least 1.0% to at most 40.0% by weight of an elastomer, for example at least 1.0% to at most 30.0% by weight of an elastomer, for example at least 1.0% to at most 25.0% by weight of an elastomer, for example at least 5.0% to at most 40.0% by weight of an elastomer, for example at least 5.0% to at most 35.0% by weight of an elastomer, for example at least 5.0% to at most 30.0% by weight of an elastomer, preferably at least 5.0% and at most 25.0% by weight of an elastomer, for example at least 6.0% to at most 40.0% by weight of an elastomer, for example at least 6.0% to at most 35.0% by weight of an elastomer, for example at least 6.0% to at most 30.0% by weight of an elastomer, preferably at least 6.0% and at most 25.0% by weight of an elastomer, based on the total weight of the blend, for example at least 7.0% to at most 40.0% by weight of an elastomer, for example at least 7.0% to at most 35.0% by weight of an elastomer, for example at least 7.0% to at most 30.0% by weight of an elastomer, preferably at least 7.0% and at most 25.0% by weight of an elastomer, based on the total weight of the blend; preferably at least 8.0% to at most 40.0% by weight of an elastomer, for example at least 8.0% to at most 35.0% by weight of an elastomer, for example at least 8.0% to at most 30.0% by weight of an elastomer, preferably at least 8.0% and at most 25.0% by weight of an elastomer, based on the total weight of the blend; preferably at least 9.0% to at most 40.0% by weight of an elastomer, for example at least 9.0% to at most 35.0% by weight of an elastomer, for example at least 9.0% to at most 30.0% by weight of an elastomer, preferably at least 9.0% and at most 25.0% by weight of an elastomer, based on the total weight of the blend; for example at least 10.0% to at most 40.0% by weight of an elastomer, for example at least 10.0% to at most 35.0% by weight of an elastomer, for example at least 10.0% to at most 30.0% by weight of an elastomer, preferably at least 10.0% and at most 25.0% by weight of an elastomer, based on the total weight of the blend; for example at least 11.0% to at most 40.0% by weight of an elastomer, for example at least 11.0% to at most 35.0% by weight of an elastomer, for example at least 11.0% to at most 30.0% by weight of an elastomer, preferably at least 11.0% and at most 25.0% by weight of an elastomer, based on the total weight of the blend. Preferably the elastomer is selected from the group comprising ethylene octene rubber (EOR), ethylene butene monomer rubber (EBM), and mixture thereof.

Preferably, the coating is applied directly on the blend. Preferably, the article is an injection-molded article. Preferably, the step of molding the blend into an article comprises the step of injection-molding the blend into an article. Preferably, the step of at least partially coating the article with at least one coating comprises the step of at least partially coating the blend with at least one coating.

In a preferred embodiment, said process comprises a reduced flaming step, wherein the flaming step may be reduced in time or reduced in power. In a more preferred embodiment, said process is free of any flaming step. The resulting article may also be referred to as an "unflamed article". Preferably, the article is an unflamed article. As used herein, the term "flaming step" refers to a step involving a flame treatment of the article, often used prior to application of a coating, as described above, for example using a mixture of air and commercial propane.

The present invention therefore encompasses an article, wherein the article comprises a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend;
at least 0.1% to at most 10.0% by weight of a compatibilizer, based on the total weight of the blend; and
at least 0.1% to at most 40.0% by weight of an elastomer, based on the total weight of the blend, wherein the elastomer is selected from the group comprising ethylene octene rubber and ethylene butene monomer rubber;
wherein said article is unflamed and is at least partially coated with at least one coating.

Preferably, an article is provided, wherein the article comprises a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 5.0% to at most 40.0% by weight of an inorganic filler, based on the total weight of the blend;
at least 0.1% to at most 10.0% by weight of a compatibilizer, based on the total weight of the blend; and
at least 0.1% to at most 40.0% by weight of an elastomer, based on the total weight of the blend, wherein the elastomer is selected from the group comprising ethylene octene rubber and ethylene butene monomer rubber;
wherein said article is at least partially coated with at least one coating. Preferably, said article is not-flamed (unflamed) prior to being coated.

Preferably, an article is provided, wherein the article comprises a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 5.0% to at most 40.0% by weight of an inorganic filler, based on the total weight of the blend;
at least 0.1% to at most 10.0% by weight of a compatibilizer, based on the total weight of the blend; and
at least 5.0% to at most 40.0% by weight of an elastomer, based on the total weight of the blend, wherein the elastomer is selected from the group comprising ethylene octene rubber and ethylene butene monomer rubber;
wherein said article is at least partially coated with at least one coating. Preferably, said article is not-flamed (unflamed) prior to being coated.

Preferably, an article is provided, wherein the article comprises a blend comprising:
at least 5.0% to at most 20.0% by weight of polylactic acid, based on the total weight of the blend;

at least 5.0% to at most 92.0% by weight of polypropylene or of a mixture of polypropylene and polyethylene, based on the total weight of the blend;

from 5.0% to at most 40.0% by weight of an inorganic filler, based on the total weight of the blend;

at least 0.1% to at most 10.0% by weight of a compatibilizer, based on the total weight of the blend; and at least 6.0% to at most 30.0% by weight of an elastomer, based on the total weight of the blend, wherein the elastomer is selected from the group comprising ethylene octene rubber and ethylene butene monomer rubber;

wherein said article is at least partially coated with at least one coating. Preferably, said article is not-flamed (unflamed) prior to being coated.

Preferably, an article is provided, wherein the article comprises a blend comprising:

at least 5.0% to at most 20.0% by weight of polylactic acid, based on the total weight of the blend;

at least 5.0% to at most 92.0% by weight of polypropylene or of a mixture of polypropylene and polyethylene, based on the total weight of the blend;

from 5.0% to at most 40.0% by weight of an inorganic filler, based on the total weight of the blend;

at least 0.1% to at most 10.0% by weight of a compatibilizer, based on the total weight of the blend; and at least 7.0% to at most 25.0% by weight of an elastomer, based on the total weight of the blend, wherein the elastomer is selected from the group comprising ethylene octene rubber and ethylene butene monomer rubber; preferably at least 8.0% to at most 40.0% by weight of an elastomer, for example at least 8.0% to at most 35.0% by weight of an elastomer, for example at least 8.0% to at most 30.0% by weight of an elastomer, preferably at least 8.0% and at most 25.0% by weight of an elastomer, based on the total weight of the blend; preferably at least 9.0% to at most 40.0% by weight of an elastomer, for example at least 9.0% to at most 35.0% by weight of an elastomer, for example at least 9.0% to at most 30.0% by weight of an elastomer, preferably at least 9.0% and at most 25.0% by weight of an elastomer, based on the total weight of the blend; for example at least 10.0% to at most 40.0% by weight of an elastomer, for example at least 10.0% to at most 35.0% by weight of an elastomer, for example at least 10.0% to at most 30.0% by weight of an elastomer, preferably at least 10.0% and at most 25.0% by weight of an elastomer, based on the total weight of the blend; for example at least 11.0% to at most 40.0% by weight of an elastomer, for example at least 11.0% to at most 35.0% by weight of an elastomer, for example at least 11.0% to at most 30.0% by weight of an elastomer, preferably at least 11.0% and at most 25.0% by weight of an elastomer, based on the total weight of the blend;

wherein said article is at least partially coated with at least one coating. Preferably, said article is not-flamed (unflamed) prior to being coated.

The present article is at least partially coated with at least one coating, preferably wherein said coating is selected from the group comprising: a paint, a varnish, an adhesive, a lacquer, and combinations thereof. For example, said coating may comprise at least one layer, preferably at least two layers, more preferably at least three layers, preferably wherein each layer is selected from the group comprising: a paint, a varnish, an adhesive, a lacquer, and combinations thereof. For example, the coating may comprise a base coat and a clear coat, or the coating may comprise a primer, a base coat and a clear coat. The coating, preferably comprising a paint, may be solvent borne or water borne. Typical coatings suitable to coat the article are commercially available from BASF, DuPont, AkzoNobel, and Wörwag.

The coating may cover the article surface completely or partially. Thus, in certain embodiments, some parts of the surface of the article may be coated by one or more layers of coating, whereas other parts of the surface may be uncoated or may be coated by one or more other layers.

The coating, such as a paint, may comprise pigments to provide a certain color. The color of the coating may be selected from the group comprising: black, red, orange, yellow, green, blue, purple, white, brown, silver, or any other color.

The present article comprises a blend or is made of blend, wherein the blend comprises at least 5.0% to at most 20.0% by weight of polylactic acid (PLA), based on the total weight of the blend. In some embodiments, the blend may comprise at least 6.0% by weight, for example at least 7.0% by weight, for example at least 8.0% by weight, for example at least 9.0% by weight, for example at least 10.0% by weight, for example at least 11.0% by weight, for example at least 12.0% by weight, for example at least 13.0% by weight, for example at least 14.0% by weight, for example at least 15.0% by weight, for example at least 16.0% by weight, for example at least 17.0% by weight, for example at least 18.0% by weight, or for example at least 19.0% by weight of polylactic acid. In some embodiments, the blend may comprise at most 19.0%, for example at most 18.0%, for example at most 17.0%, for example at most 16.0%, for example at most 15.0%, for example at most 14.0%, for example at most 13.0%, for example at most 12.0%, for example at most 11.0%, for example at most 10.0%, for example at most 9.0%, for example at most 8.0%, for example at most 7.0%, or for example at most 6.0% by weight of PLA, based on the total weight of the blend. In some embodiments, the blend comprises at least 6.0% to at most 19.0% by weight of polylactic acid, based on the total weight of the blend, for example the blend comprises at least 6.0% to at most 18.0% by weight of polylactic acid, for example the blend comprises at least 7.0% to at most 17.0% by weight of polylactic acid, for example the blend comprises at least 7.0% to at most 16.0% by weight of polylactic acid, for example the blend comprises at least 8.0% to at most 15.0% by weight of polylactic acid, for example the blend comprises at least 8.0% to at most 14.0% by weight of polylactic acid, for example the blend comprises at least 9.0% to at most 13.0% by weight of polylactic acid, for example the blend comprises at least 9.0% to at most 12.0% by weight of polylactic acid, based on the total weight of the blend. Preferably, the blend comprises at least 7.0% to at most 13.0% by weight of polylactic acid, based on the total weight of the blend. For example, the blend may comprise at least 8.0% to at most 12.0% by weight of PLA, for example at least 9.0% to at most 11.0% by weight, for example about 10.0% by weight of PLA based on the total weight of the blend.

As used herein, the terms "polylactic acid" or "polylactide" or "PLA" are used interchangeably and refers to poly (lactic acid) polymers containing repeat units derived from lactic acid. Preferred grades of PLA are Synbra PLLA 1010, NatureWorks® PLA polymer 3251, NatureWorks® PLA polymer 6201D, and Futerro® PLA.

In some embodiments, the PLA is provided in the form of pellets, fluff, or powder, preferably in the form of pellets. As used herein, the term "powder" refers to ground fluff or ground pellets.

As used herein, the terms "polymer product" or "polymer pellet" are defined as polymer material that is prepared through compounding and homogenizing of the resin, for instance with mixing and/or extruder equipment. Preferably, the polymer particles have an average diameter (D50) of at most 2 mm, more preferably at most 1 mm, more preferably at most 100 μm. The D50 is defined as the particle size for which fifty percent by volume of the particles has a size lower than the D50. The average size of the particles is preferably assessed by particle sieving. Alternatively, the size may be measured by using optical measurements, for example with a Camsizer.

PLA suitable for the blend can be prepared according to any method known in the state of the art. The PLA can be prepared by ring-opening polymerization of raw materials having required structures selected from lactide, which is a cyclic dimer of lactic acid, glycolide, which is a cyclic dimer of glycolic acid, and caprolactone and the like. Lactide includes L-lactide, which is a cyclic dimer of L-lactic acid, D-lactide, which is a cyclic dimer of D-lactic acid, meso-lactide, which is a cyclic dimer of D-lactic acid and L-lactic acid, and DL-lactide, which is a racemate of D-lactide and L-lactide. The PLA polymers used in the present blend can be derived from D-lactic acid, L-lactic acid, or a mixture thereof. A mixture of two or more PLA polymers can be used.

The PLA for use in the present blend may comprise the product of polymerization reaction of a racemic mixture of L-lactides and D-lactides, also known as poly-DL-lactide (PDLLA). The PLA for use in the present blend may comprise the product of polymerization reaction of meso-lactide. The PLA for use in the present blend may comprise the product of polymerization reaction of mainly D-lactides, also known as poly-D-lactide (PDLA). Preferably, The PLA for use in the present blend comprises the product of polymerization reaction of mainly L-lactides (or L,L-lactides), also known as poly-L-lactide (PLLA). Other suitable PLA can be copolymers of PLLA with some D lactic acid units. PLLA-PDLA stereocomplexes can also be used.

Copolymeric components other than lactic acid may be used and include dicarboxylic acid, polyhydric alcohol, hydroxycarboxylic acid, lactone, or the like, which have two or more functional groups each capable of forming an ester bonding. These are, for example, polyester, polyether, polycarbonate, or the like which have the two or more unreacted functional groups in a molecule. The hydroxycarboxylic acids may be selected from the list comprising glycolic acid, hydroxybutyric acid, hydroxyvaleric acid, hydroxypentanoic acid, hydroxycaproic acid, and hydroxyheptanoic acid.

Other examples of copolymers include poly-ester-urethanes, as disclosed in US 2010/0113734 A1, which is hereby incorporated by reference in its entirety, or lactide-amino-acid comonomers. PLLA-PDLA stereocomplexes or copolymer stereocomplexes like poly-ester-urethane stereocomplexes can also be used in the present blend. Examples of suitable copolymers can be polylactide-urethane copolymers, which are the reaction products that can be obtained by a process comprising the step of contacting:

a polylactide having terminal hydroxyl groups, produced by contacting at least one lactide monomer with a diol or a diamine of general formula $R^1(A)_2$ wherein A is —OH or —NH$_2$ and $R^1$ is a substituted or an unsubstituted $C_{1-20}$ alkylene or $C_{6-20}$ arylene group in the presence of a catalytic system under polymerization conditions, with a diisocyanate compound of general formula O=C=N—$R^2$—N=C=O wherein $R^2$ is a substituted or unsubstituted $C_{1-20}$alkylene or $C_{6-20}$ arylene group, optionally in the presence of a second diol or diamine of general formula $R^3(A)_2$ wherein A is —OH or —NH$_2$ and $R^3$ is a substituted or an unsubstituted $C_{1-20}$ alkylene or $C_{6-20}$ arylene group in the presence of a catalytic system under polymerization conditions. Preferably, the polylactide and the polylactide-urethane copolymers can be produced by reactive extrusion.

Preferably, $R^1$, $R^2$ and $R^3$ are an alkylene or an arylene group containing from 3 to 20 carbon atoms, preferably from 3 to 13 carbon atoms, more preferably from 6 to 13 carbon atoms. The alkyl or the aryl group may be substituted or not. The alkyl group may be linear, cyclic, saturated or unsaturated. Preferably, $R^1$, $R^2$ and $R^3$ are an arylene group. Examples of suitable diamines include 1,4-butanediamine, 1,6-hexanediamine, 1,4-cyclohexanediamine, 1,4-phenyldiamine, 4,4'-diaminodiphenylmethane, preferably 1,4-phenyldiamine or 4,4'-diaminodiphenylmethane. Examples of suitable diols include 1,3-propandiol, 1,3-butanediol, 1,4-butanediol, 1,6-hexanediol, 1,7-heptanediol, 1,8-octanediol, and preferably xylene glycol. For example, the lactide used to obtain a polylactide-urethane copolymer can be a compound formed by the cyclic dimerization of the lactic acid. The lactide may exist in a variety of isomeric forms such as L, L-lactide, D, D-lactide and D, L-lactide. Preferably, L, L-lactide can be used. Examples of suitable diisocyanates include 1,6-hexamethylene diisocyanate (HMDI), 4,4'-dicyclohexylmethane diisocyanate, 4,4'-methylene diphenylisocyanate (MDI), toluene diisocyanate (TDI), and p-phenylene diisocyanate. Preferably, 4,4'-methylene diphenylisocyanate can be used.

In a preferred embodiment, the PLA for use in the present blend comprises PLLA. In an embodiment, the PLA for use in the present blend can comprise a physical polymer blend of PLA and at least one other polymer.

In an embodiment, the polylactic acid has a specific gravity of at least 1.228 g/cm$^3$ (=g/cc) to, for example of at least 1.230 g/cm$^3$, for example of at least 1.232 g/cm$^3$, for example of at least 1.235 g/cm$^3$, as determined in accordance with ASTM D792. In an embodiment, the polylactic acid has a specific gravity of at most 1.255 g/cm$^3$, for example of at most 1.250 g/cm$^3$, for example of at most 1.248 g/cm$^3$, for example of at most 1.245 g/cm$^3$, as determined in accordance with ASTM D792. In an embodiment, the polylactic acid has a specific gravity of from about 1.228 g/cm$^3$ to about 1.255 g/cm$^3$, for example from about 1.230 g/cm$^3$ to about 1.250 g/cm$^3$, for example from about 1.232 g/cm$^3$ to about 1.248 g/cm$^3$, for example from about 1.235 g/cm$^3$ to about 1.245 g/cm$^3$, as determined in accordance with ASTM D792.

In an embodiment, the polylactic acid may exhibit a crystalline melt temperature of from at least 140° C., for example of at least 145° C., for example of at least 150° C., for example of at least 160° C., as determined in accordance with ASTM D3418. In an embodiment, the polylactic acid may exhibit a crystalline melt temperature of at most 190° C., for example of at most 185° C., for example of at most 180° C., for example of at most 170° C., as determined in accordance with ASTM D3418. In an embodiment, the polylactic acid may exhibit a crystalline melt temperature of from about 140° C. to about 190° C., for example from about 145° C. to about 185° C., for example from about 150° C. to about 180° C., for example from about 160° C. to about 170° C., as determined in accordance with ASTM D3418.

In an embodiment, the polylactic acid may exhibit a glass transition temperature of at least 45° C., for example of at least 50° C., for example of at least 50° C., for example of at least 55° C., as determined in accordance with ASTM D3417. In an embodiment, the polylactic acid may exhibit a glass transition temperature of at most 85° C., for example of at most 80° C., for example of at most 70° C., for example of at most 60° C., as determined in accordance with ASTM D3417. In an embodiment, the polylactic acid may exhibit a glass transition temperature of from about 45° C. to about 85° C., for example from about 50° C. to about 80° C., for example from about 50° C. to about 70° C., for example from about 55° C. to about 60° C., as determined in accordance with ASTM D3417.

In an embodiment, the polylactic acid may exhibit a tensile yield strength of at least 4,000 psi, for example of at least 5,000 psi, for example of at least 6,000 psi, as determined in accordance with ASTM D638. In an embodiment, the polylactic acid may exhibit a tensile yield strength of at most 25,000 psi, for example of at most 15,000 psi, for example of at most 10,000 psi, as determined in accordance with ASTM D638. In an embodiment, the polylactic acid may exhibit a tensile yield strength of from about 4,000 psi to about 25,000 psi, for example from about 5,000 psi to about 15,000 psi, for example from about 6,000 psi to about 10,000 psi, as determined in accordance with ASTM D638.

In an embodiment, the polylactic acid may exhibit a tensile elongation of at least 0.5%, for example of at least 1.0%, for example of at least 1.5%, as determined in accordance with ASTM D638. In an embodiment, the polylactic acid may exhibit a tensile elongation of at most 20.0%, for example of at most 10.0%, for example of at most 6.0%, as determined in accordance with ASTM D638. In an embodiment, the polylactic acid may exhibit a tensile elongation of from about 0.5% to about 20.0%, for example of from about 1.0% to about 10.0%, for example of from about 1.5% to about 6.0%, as determined in accordance with ASTM D638.

In an embodiment, the polylactic acid may exhibit a notched Izod impact of at least 0.1 ft-lb/in, for example of at least 0.15 ft-lb/in, for example of at least 0.2 ft-lb/in, as determined in accordance with ASTM D256 method A. In an embodiment, the polylactic acid may exhibit a notched Izod impact of at most 0.8 ft-lb/in, for example of at most 0.6 ft-lb/in, for example of at most 0.5 ft-lb/in, as determined in accordance with ASTM D256 method A. In an embodiment, the polylactic acid may exhibit a notched Izod impact of from about 0.1 ft-lb/in to about 0.8 ft-lb/in, for example of from about 0.15 ft-lb/in to about 0.6 ft-lb/in, for example of from about 0.2 ft-lb/in to about 0.5 ft-lb/in, as determined in accordance with ASTM D256 method A.

In an embodiment, the polylactic acid may exhibit a melt density of at least 1.05 g/cm$^3$, for example of at least 1.06 g/cm$^3$, for example of at least 1.07 g/cm$^3$, as determined in accordance with ASTM D1238 at 230° C. In an embodiment, the polylactic acid may exhibit a melt density of at most 1.11 g/cm$^3$, for example of at most 1.10 g/cm$^3$, for example of at most 1.09 g/cm$^3$, as determined in accordance with ASTM D1238 at 230° C. In an embodiment, the polylactic acid may exhibit a melt density of from about 1.05 g/cm$^3$ to about 1.11 g/cm$^3$, for example of from about 1.06 g/cm$^3$ to about 1.10 g/cm$^3$, for example of from about 1.07 g/cm$^3$ to about 1.09 g/cm$^3$, as determined in accordance with ASTM D1238 at 230° C.

In an embodiment, the polylactic acid has a melt index MI$_2$ of at least 10.0 g/10 min, for example of at least 12.0 g/10 min, for example of at least 15.0 g/10 min, as determined at 210° C. under a 2.16 kg load in accordance with ASTM D1238. In an embodiment, the polylactic acid has a melt index MI$_2$ of at most 80.0 g/10 min, for example of at most 60.0 g/10 min, for example of at most 40.0 g/10 min, as determined at 210° C. under a 2.16 kg load in accordance with ASTM D1238. In a preferred embodiment, the polylactic acid has a melt index MI$_2$ of at least 10.0 g/10 min and at most 80.0 g/10 min, for example of at least 12.0 g/10 min and at most 60.0 g/10 min, for example of at least 15.0 g/10 min and at most 40.0 g/10 min, as determined at 210° C. under a 2.16 kg load in accordance with ASTM D1238.

The present article comprises a blend or is made of blend comprising at least 5.0% to at most 92.0% by weight of polypropylene (PP) or of a mixture of polypropylene (PP) and polyethylene (PE), based on the total weight of the blend.

As used herein, the term "propylene-based polymer" refers to polypropylene and mixtures of polypropylene and polyethylene. As used herein, the term "mixture of polypropylene and polyethylene" refers to mixtures of polypropylene polymers with polyethylene polymers, but also to polypropylene-polyethylene copolymers.

In some embodiments, the PP (or mixture of PP with PE) is provided in the form of pellets, fluff, or powder, preferably in the form of pellets.

In some embodiments, the mixture of PP and PE comprises one or more polypropylene heterophasic copolymers. In some embodiments, the mixture of PP and PE consists of one or more polypropylene heterophasic copolymers. The term "polypropylene heterophasic copolymer" (PPHC) refers to a polypropylene or polypropylene copolymer matrix phase joined to (i.e., containing) a copolymer phase or component. The copolymer phase can include ethylene and optionally higher alpha-olefin polymer, such as amorphous ethylene-propylene copolymer. In some embodiments, the mixture of PP and PE comprises or consists of a polypropylene heterophasic copolymer with ethylene as copolymer.

The copolymer phase of a PPHC may be a random copolymer of propylene (C$_3$) and ethylene (C$_2$), also referred to as an ethylene/propylene rubber (EPR). Without wishing to be limited by theory, the EPR portion of the PPHC can have rubbery characteristics which, when incorporated within the matrix of the homopolymer component, may function to provide increased impact strength to the PPHC. In an embodiment, the EPR portion of the PPHC comprises at least 18 wt. % of the PPHC (wt. %=% by weight), for example at least 22 wt. % of the PPHC. In an embodiment, the EPR portion of the PPHC comprises at most 30 wt. % of the PPHC, for example most 26 wt. % of the PPHC. In an embodiment, the EPR portion of the PPHC comprises from 18 wt. % to 30 wt. % of the PPHC, for example from 22 wt. % to 26 wt. % of the PPHC.

In an embodiment, the amount of ethylene present in the EPR portion of the PPHC is at least 35 wt. %, for example at least 40 wt. %, based on the total weight of the EPR portion. In an embodiment, the amount of ethylene present in the EPR portion of the PPHC is at most 50 wt. %, for example at most 45 wt. %, based on the total weight of the EPR portion. In an embodiment, the amount of ethylene present in the EPR portion of the PPHC is of from 35 wt. % to 50 wt. %, for example of from 40 wt. % to 45 wt. %, based on the total weight of the EPR portion. The amount of ethylene which can be present in the EPR portion of the PPHC may be determined spectrophotometrically using a Fourier transform infrared spectroscopy (FTIR) method. Specifically, the FTIR spectrum of a polymeric sample is recorded for a series of samples having a known EPR ethylene content. The ratio of transmittance at 720 $cm^{-1}$/900 $cm^{-1}$ can be calculated for each ethylene concentration and a calibration curve may then be constructed. Linear regression analysis on the calibration curve can then be carried out to derive an equation that is then used to determine the EPR ethylene content for a sample material.

In an embodiment, the copolymer phase of a PPHC has an ethylene concentration of at least 8 wt. %, for example of at least 10 wt. %, for example of at least 11 wt. %, for example of at least 12 wt. %, based on the total weight of the PPHC. In an embodiment, the copolymer phase of a PPHC has an ethylene concentration of at most 18 wt. %, for example of at most 16 wt. %, for example of at most 15 wt. %, for example of at most 14 wt. %, based on the total weight of the PPHC. In an embodiment, the copolymer phase of a PPHC has an ethylene concentration of from 8 wt. % to 18 wt. %, for example of from 10 wt. % to 16 wt. %, for example of from 11 wt. % to 15 wt. %, for example of from 12 wt. % to 14 wt. %, based on the total weight of the PPHC.

In some embodiments, increasing the ethylene content increases the impact strength of the PPHC. Examples of suitable polypropylene heterophasic copolymer include without limitation products such as Total 5571 (having a $C_2$ content of 11 wt. %), PPC7810 (having a $C_2$ content of 13.5 wt. %) and PPC9760 (having a $C_2$ content of 8 wt. %), which are commercially available products from Total Petrochemicals.

When the propylene-based polymer comprises more than one polypropylene heterophasic copolymer, the ethylene content of the EPR portions for multiple PPHCs may be calculated as an average ethylene content by weight-averaging the ethylene contents of the individual PPHCs based on the relative quantities of each PPHC. For example, a polyolefin comprising 22 wt. % of a first PPHC which has an ethylene content of 8 wt. % (e.g., PPHC 9760), and 65 wt. % of a second PPHC which has an ethylene content of 13.5 wt. % (e.g., PPHC 7810), has an average ethylene content value equal to 10.5 wt. %, as calculated by multiplying the relative quantities of the individual PPHCs by their ethylene content (i.e., 0.22*8 wt. %+0.65*13.5 wt. %=10.5 wt. %).

In an embodiment, the propylene-based polymer comprises polypropylene homopolymer. Unless otherwise specified, the term "polypropylene homopolymer" refers to propylene homopolymers, i.e., polypropylene, or those polyolefins composed primarily of propylene and may contain up to 0.5 wt. % of other comonomers, including but not limited to $C_2$ to $C_8$ alpha-olefins (e.g., ethylene and 1-butene), wherein the amount of comonomer is insufficient to change the amorphous or crystalline nature of the propylene polymer significantly. Despite the potential presence of small amounts of other comonomers, the polypropylene is generally referred to as a polypropylene homopolymer.

The term "co-monomer" refers to olefin co-monomers which are suitable for being polymerized with olefin monomers, preferably ethylene or propylene monomers. Co-monomers may comprise but are not limited to aliphatic $C_2$-$C_{20}$ alpha-olefins. Examples of suitable aliphatic $C_2$-$C_{20}$ alpha-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. In an embodiment, the co-monomer is vinyl acetate. The term "co-polymer" refers to a polymer, which is made by linking two different types of in the same polymer chain. The term "homo-polymer" refers to a polymer which is made by linking olefin monomers, in the absence of co-monomers. The amount of co-monomer can be from 0 to 12 wt % based on the weight of the polypropylene, more preferably it can be from 0 to 9 wt % and most preferably it can be from 0 to 7 wt %. A copolymer can be a random or block (heterophasic) copolymer. Preferably, the copolymer is a random copolymer.

In an embodiment, the propylene-based polymer comprises polypropylene-based random copolymer. Unless otherwise specified, the term "propylene-based random copolymer" refers to those copolymers composed primarily of propylene and an amount of at least one comonomer, wherein the polymer includes at least about 0.1 wt. %, for example at least about 0.8 wt. %, for example at least about 2.0 wt. %, for example at most 5.0 wt. % comonomer relative to the total weight of polymer. The comonomers may be selected from $C_2$ to $C_{10}$ alkenes. For example, the comonomers may be selected from ethylene, 1-butene, 1-pentene, 1-hexene, 1-heptene, 1-octene, 1-nonene, 1-decene, 4-methyl-1-pentene, and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

In an embodiment, the propylene-based polymer may be formed in the presence of one or more catalysts which can be chromium, metallocene, post-metallocene, Ziegler-Natta catalysts or a combination thereof. In an embodiment, the catalyst for preparing the polypropylene-based polymer is a chromium catalyst. In an embodiment, the catalyst for preparing the polypropylene-based polymer is a metallocene catalyst. In an embodiment, the catalyst for preparing the polypropylene-based polymer is a post-metallocene catalyst. In an embodiment, the catalyst for preparing the polypropylene-based polymer is a Ziegler-Natta catalyst.

In an embodiment, the propylene-based polymer may be formed in a gas phase process. In an embodiment, the propylene-based polymer may be formed in a slurry process. In an embodiment, the propylene-based polymer has a monomodal (or unimodal) molecular weight distribution. In an embodiment, the propylene-based polymer has a multimodal, for example a bimodal, molecular weight distribution.

In an embodiment, the mixture of polypropylene (PP) and polyethylene (PE) comprises polyethylene (PE). Polyethylenes, such as high density polyethylene (HDPE), for example, may provide additional impact resistance as well as scratch-resistance to the polymeric blend while also increasing the stiffness of the blend. The incorporation of a polyethylene may be particularly useful when the PPHC has an ethylene content (or average $C_2$ content) less than about 12.5 wt. %. An example of a suitable HDPE includes, without limitation, product M6091 commercially available from Total Petrochemicals. The polyethylene may have a concentration in a range from about 1 wt. % to 20 wt. % based on the total weight of the mixture of polypropylene (PP) and polyethylene (PE).

The polyethylene can be selected from, but not limited to, LDPE (Low Density Polyethylene), LLDPE (Linear Low Density Polyethylene), and HDPE (High Density Polyethylene) and blends thereof. The polyethylene can be selected from, but not limited to, Ultra High Molecular Weight (UHMW), High Molecular Weight (HMW), Medium Molecular Weight (MMW) and Low Molecular Weight (LMW). The polyethylene can be produced in the presence of any catalyst known in the art, such as chromium catalysts, Ziegler-Natta catalysts, metallocene catalysts or post-metallocene catalysts. Preferably, the polyethylene for use in the blend has a Melt Index (MI$_2$), measured at 190° C. under a 2.16 kg load according to ISO 1133 condition D, of from 0.1 g/10 min to 100 g/10 min, preferably of from 0.3 g/10 min to 10.0 g/10 min. In an embodiment, the polyethylene has a density of from 0.900 g/cm³ to 0.960 g/cm³, preferably of from 0.915 g/cm³ to 0.940 g/cm³.

In an embodiment, the polypropylene has a melt index MI$_2$ of at least 4.0 g/10 min, for example of at least 10.0 g/10 min, for example of at least 15.0 g/10 min, as determined at 230° C. under a 2.16 kg load in accordance with ISO 1133. In an embodiment, the polypropylene has a melt index MI$_2$ of at most 100.0 g/10 min, for example of at most 40.0 g/10 min, for example of at most 30.0 g/10 min, as determined at 230° C. under a 2.16 kg load in accordance with ISO 1133. In a preferred embodiment, the polypropylene has a melt index MI$_2$ of at least 4.0 g/10 min and at most 100.0 g/10 min, preferably of at least 10.0 g/10 min and at most 40.0 g/10 min, preferably of at least 15.0 g/10 min and at most 30.0 g/10 min, as determined at 230° C. under a 2.16 kg load in accordance with ISO 1133.

In an embodiment, the mixture of polypropylene and polyethylene has a melt index MI$_2$ of at least 4.0 g/10 min, for example of at least 10.0 g/10 min, for example of at least 15.0 g/10 min, as determined at 230° C. under a 2.16 kg load in accordance with ISO 1133. In an embodiment, the mixture of polypropylene and polyethylene has a melt index MI$_2$ of at most 100.0 g/10 min, for example of at most 40.0 g/10 min, for example of at most 30.0 g/10 min, as determined at 230° C. under a 2.16 kg load in accordance with ISO 1133. In a preferred embodiment, the mixture of polypropylene and polyethylene has a melt index MI$_2$ of at least 4.0 g/10 min and at most 100.0 g/10 min, preferably of at least 10.0 g/10 min and at most 40.0 g/10 min, preferably of at least 15.0 g/10 min and at most 30.0 g/10 min, as determined at 230° C. under a 2.16 kg load in accordance with ISO 1133.

In an embodiment, the mixture of polypropylene and polyethylene has an ethylene content of at least 1.0% by weight, based on the total weight of the mixture of polypropylene and polyethylene, for example of at least 2.0%, for example of at least 5.0%, for example of at least 10.0%, for example of at least 15.0%, for example of at least 20.0%, for example of at least 30.0%, for example of at least 40.0%. The mixture of polypropylene and polyethylene may have an ethylene content of at most 50.0% by weight, based on the total weight of the mixture of polypropylene and polyethylene, for example of at most 40.0%, for example of at most 30.0%, for example of at most 20.0%, for example of at most 10.0%, for example of at most 5.0%, for example of at most 2.0%. The mixture of polypropylene and polyethylene may have an ethylene content of at least 10.0% by weight and at most 20% by weight, for example of at least 11.0% by weight and at most 19.0% by weight, for example of at least 12.0% by weight and at most 18.0% by weight, based on the total weight of the mixture of polypropylene and polyethylene.

In an embodiment, the mixture of polypropylene and polyethylene has a propylene content of at least 50.0% by weight, based on the total weight of the mixture of polypropylene and polyethylene, for example of at least 60.0%, for example of at least 70.0%, for example of at least 80.0%, for example of at least 90.0%, for example of at least 95.0%, for example of at least 98.0%, for example of at least 99.0%.

In an embodiment, the polypropylene has a density of from 0.895 to 0.920 g/cm³, preferably from 0.900 to 0.915 g/cm³, preferably from 0.905 to 0.910 g/cm³, as determined with the ISO 1183 standard. In an embodiment, the mixture of polypropylene with polyethylene has a density of from 0.895 to 0.920 g/cm³, preferably from 0.900 to 0.915 g/cm³, preferably from 0.905 to 0.910 g/cm³, as determined with the ISO 1183 standard at 23° C.

The present article comprises a blend or is made of blend comprising from 0.0% to at most 40.0% by weight of an inorganic filler based on the total weight of the blend. For example, the blend may comprise at least 5.0% by weight of an inorganic filler, for example at least 10.0%, for example at least 15.0%, for example at least 20.0%, for example at least 25.0%, for example at least 30.0%, for example at least 35.0% by weight of inorganic filler, based on the total weight of the blend. For example, the blend may comprise at most 35.0%, for example at most 30.0%, for example at most 25.0%, for example at most 20.0%, for example at most 15.0%, for example at most 10.0%, for example at most 5.0% by weight of an inorganic filler, based on the total weight of the blend. For example, the blend may comprise of from 5.0% to 35.0%, for example of from 10.0% to 30.0%, for example of from 15.0% to 25.0% by weight of an inorganic filler, based on the total weight of the blend. In an embodiment, the blend comprises one or more inorganic fillers to increase the flexural modulus and tensile mechanical properties of articles formed from a polymeric composition described herein. Incorporating one or more inorganic fillers may also increase properties such as the heat distortion temperature, for example, of articles formed from a polymeric composition described herein. Suitable inorganic fillers include talc, carbon black, limestone, marble, ceramic, and other common inorganic fillers known to one of skill in the art. Preferably, the inorganic filler is talc.

Preferably, the article comprises a blend or is made of blend comprising at least 5.0% by weight of talc, based on the total weight of the blend, for example at least 10.0%, for example at least 15.0%, for example at least 20.0%, for example at least 25.0%, for example at least 30.0%, for example at least 35.0% by weight of talc, based on the total weight of the blend. For example, the blend may comprise at most 40.0% by weight of talc, based on the total weight of the blend, for example at most 35.0% by weight of talc, based on the total weight of the blend. For example, the blend may comprise of from 5.0% to 40.0% by weight of talc, for example of from 10.0% to 35.0%, for example of from 15.0% to 25.0% by weight of talc, based on the total weight of the blend.

Preferably, the talc has a particle size distribution with a D50 of at least 6.0 μm, preferably at least 7.0 μm, preferably at least 8.0 μm, preferably at least 9.0 μm, preferably at least 10.0 μm, as measured with a Malvern 2000 diffractometer. Preferably, the talc has a particle size distribution with a D90 of at least 15.0 μm, preferably at least 17.50 μm, preferably at least 20.0 μm, preferably at least 22.5 μm, preferably at least 25.0 μm, as measured with a Malvern 2000 diffractometer. In some embodiments, the talc has a particle size distribution with a D50 of at least 6.0 μm and a D90 of at least 15.0 μm, preferably a D50 of at least 7.0 μm and a D90 of at least 17.5 μm, preferably a D50 of at least 8.0 μm and a D90 of at least 20.0 μm, preferably a D50 of at least 9.0 μm and a D90 of at least 22.5 μm, preferably a D50 of at least 10.0 μm and a D90 of at least 25.0 μm, as measured with a Malvern 2000 diffractometer. The talc particle size distribution (PSD) D50 is measured by laser diffraction analysis on a Malvern type analyser (Malvern 2000). The particle size distribution D50 is defined as the particle size for which fifty percent by volume of the particles has a size lower than the D50. The particle size distribution D90 is defined as the particle size for which ninety percent by volume of the particles has a size lower than the D90.

Articles made from the present blends comprising ethylene octene rubber or ethylene butene monomer rubber as elastomer and at least 5% by weight of talc show improved mechanical properties and improved coating suitability. For example, articles made from the present blends comprising ethylene octene rubber or ethylene butene monomer rubber as elastomer and at least 5% by weight of talc of high aspect ratio, show an improved tensile modulus.

The present article comprises a blend or is made of blend comprising at least 0.1% to at most 10.0% by weight of a compatibilizer, based on the total weight of the blend. In an embodiment, the blend comprises at least 0.5% by weight of a compatibilizer, for example at least 1.0% by weight of a compatibilizer, for example at least 2.0% by weight of a compatibilizer, based on the total weight of the blend. In an embodiment, the blend comprises at most 8.0% by weight of a compatibilizer, for example at most 7.0% by weight of a compatibilizer, for example at most 5.0% by weight of a compatibilizer, based on the total weight of the blend. In an embodiment, the blend comprises of from 0.5% to 8.0% by weight of a compatibilizer, for example of from 1.0% to 7.0% by weight of a compatibilizer, for example of from 2.0% to 5.0% by weight of a compatibilizer, based on the total weight of the blend.

In a preferred embodiment, the compatibilizer is an epoxy-functionalized polyolefin. Examples of epoxy-functionalized polyolefins suitable for use in this disclosure include without limitation epoxy-functionalized polypropylene such as glycidyl methacrylate grafted polypropylene (PP-g-GMA), epoxy-functionalized polyethylene such as polyethylene co-glycidyl methacrylate (PE-co-GMA), and combinations thereof. An example of an epoxy-functionalized polyethylene suitable for use in this disclosure includes LOTADER® GMA products such as, for example, product LOTADER® AX8840, which is a random copolymer of ethylene and glycidyl methacrylate (PE-co-GMA) having 8% GMA content (as measured by FTIR), or product LOTADER® AX8900 which is a random terpolymer of ethylene, methyl acrylate and glycidyl methacrylate having 8% GMA content, which are commercially available products from Arkema. Preferably the compatibilizer is an epoxy-functionalized polypropylene, preferably wherein the compatibilizer is glycidyl methacrylate grafted polypropylene (PP-g-GMA). In an embodiment, the PP-g-GMA has a grafting yield of at least 1% to at most 15% by weight, based on the total weight of the PP-g-GMA.

In an embodiment, the compatibilizer is a co- or ter-polymer comprising:
(a) 50.0 to 99.9 wt % of ethylene or styrene monomer;
(b) 0.1 to 50.0 wt % of an unsaturated anhydride-, epoxide- or carboxylic acid-containing monomer; and
(c) 0.0 to 50.0 wt % of a (meth)acrylic ester monomer.

The optional co- or ter-polymer comprises ethylene or styrene monomer, an unsaturated anhydride-, epoxide- or carboxylic acid-containing monomer and optionally a (meth)acrylic ester monomer.

Preferably, the co- or ter-polymer comprises:
(a) 50.0 to 99.9 wt % of ethylene or styrene monomer, preferably 50.0 to 99.8 wt %;
(b) 0.1 to 50.0 wt % of an unsaturated anhydride-, epoxide- or carboxylic acid-containing monomer; and
(c) 0.0 to 50.0 wt % of a (meth)acrylic ester monomer; the total sum of components being 100.0 wt %.

In an embodiment, the co-polymer comprises:
(a) 50.0 to 99.9 wt % of ethylene or styrene monomer, preferably 50.0 to 99.0 wt %;
(b) 0.1 to 50.0 wt % of an unsaturated anhydride-, epoxide- or carboxylic acid-containing monomer, preferably 1.0 to 50.0 wt %; the total sum of components being 100.0 wt %.

In an embodiment, the ter-polymer comprises:
(a) 50.0 to 99.8 wt % of ethylene or styrene monomer;
(b) 0.1 to 50.0 wt % of an unsaturated anhydride-, epoxide- or carboxylic acid-containing monomer; and
(c) 0.1 to 50.0 wt % of a (meth)acrylic ester monomer; the total sum of components being 100.0 wt %.

In some embodiments, the ethylene or styrene monomer (a) is present from 50.0 to 99.9 wt %, preferably from 50.0 to 99.8 wt %, more preferably from 60.0 to 99.5 wt %, even more preferably from 65.0 to 99.0 wt %, most preferably from 70.0 to 98.0 wt %. In some embodiments of the copolymer, the ethylene or styrene monomer can be present from 90.0 to 98.0 wt %.

In some embodiments, the unsaturated monomer (b) is preferably selected from an unsaturated anhydride- or epoxide-containing monomer. More preferably, the unsaturated monomer (b) is selected from a glycidyl (meth)acrylate or maleic anhydride. The unsaturated monomer (b) is preferably present from 0.1 to 40.0 wt %, more preferably from 0.2 to 30.0 wt %, even more preferably from 0.3 to 20.0 wt %, yet even more preferably from 0.3 to 15.0 wt % and most preferably from 0.3 to 10.0 wt % of the co- or ter-polymer.

The (meth)acrylic ester monomer (c), if present, is preferably selected from those acrylates which have between 1 and 10 carbon atoms such as for example methyl (meth)acrylate, ethyl (meth)acrylate, n-butyl (meth)acrylate, isobutyl (meth)acrylate, 2-ethylhexyl (meth)acrylate, or n-octyl (meth)acrylate. If present, it preferably makes up 0.1 to 50.0 wt % of the terpolymer, preferably 0.5 to 40.0 wt %, more preferably 1.0 to 30.0 wt %, even more preferably 2.0 to 25.0 wt % and most preferably 5.0 to 25.0 wt % of the terpolymer.

The copolymers of ethylene or styrene monomer and of a glycidyl (meth)acrylate or maleic anhydride can contain from 50.0 to 99.0 wt % of ethylene or styrene monomer and from 1.0 to 50.0 wt % of a glycidyl (meth)acrylate or maleic anhydride, preferably from 90.0 to 98.0 wt % of ethylene or styrene monomer and from 2.0 to 10.0 wt % of a glycidyl (meth)acrylate or maleic anhydride, the total sum of components being 100.0 wt %.

The terpolymers of ethylene or styrene monomer, of a glycidyl (meth)acrylate or maleic anhydride and of a (meth)acrylic ester monomer can contain from 50.0 to 98.8 wt % of ethylene or styrene monomer, from 0.2 to 10.0 wt % of a glycidyl (meth)acrylate or maleic anhydride and from 1.0 to 50.0 wt % of a (meth)acrylic ester monomer, the total sum of components being 100.0% of the terpolymer. Preferably the terpolymer can contain from 55.0 to 97.7 wt % of ethylene or styrene monomer, from 0.3 to 8.0% of a glycidyl (meth)acrylate or maleic anhydride, and from 2.0 to 35.0% of (meth)acrylic ester monomer, the total sum of components being 100% of the terpolymer.

Still more preferably, the co- or ter-polymer is selected among copolymers of ethylene and glycidyl methacrylate and terpolymers of ethylene or styrene, acrylic ester monomers and glycidyl methacrylate or maleic anhydride. Among those one can use for example the copolymer of ethylene and glycidyl methacrylate sold under the trademark Lotader®AX 8840 by Arkema France, the terpolymer of ethylene, ethylacrylate and maleic anhydride sold under the denomination Lotader®4700 by Arkema France, as well as the terpolymer of styrene monomer, acrylic esters and glycidyl methacrylate sold under the trademark Joncryl® by BASF.

In some embodiments, the co- or ter-polymer is selected from a terpolymer of ethylene or styrene monomer, acrylic esters and glycidyl methacrylate. Preferably, the acrylic ester is methylacrylate. An example of such a terpolymer is Lotader®AX8900 sold by Arkema France comprising 68 wt % of ethylene monomer, 8 wt % of glycidylmethacrylate and 24 wt % methyl acrylate.

The blend may be colored in mass. In some embodiments, the blend is colored in mass for example with black or grey pigments, preferably only with black pigments. In some embodiments, the blend is not colored in mass.

In a preferred embodiment, the blend comprises from 0.0% to at most 10.0% by weight of pigments, based on the total weight of the blend, preferably at most 5.0%, preferably at most 2.0%, preferably at most 1.0%, preferably at most 0.5%, preferably at most 0.2%, preferably at most 0.1%, preferably at most 0.05%, preferably at most 0.02%, preferably at most 0.01%. Preferably, the blend is essentially free of pigments.

In a preferred embodiment, the blend comprises an elastomer. The elastomer may provide additional impact resistance to the polymeric blend. In effect, incorporation of an elastomer may effectively increase the elastomeric impact behavior of the blend provided by the ethylene/polypropylene rubber portion of the PPHC. Thus, incorporation of an elastomer may be particularly useful when the PPHC has an ethylene content (or average $C_2$ content) less than about 12.5 wt. %. Examples of suitable elastomers include, without limitation, elastomers comprising ethylene such as ethylene propylene rubber (EPR), ethylene propylene diene monomer (EPDM), ethylene octene rubber (EOR), and ethylene butene monomer rubber (EBM). EPDM is an elastomer that is similar to the EPR portion in the polypropylene heterophasic copolymers. In some preferred embodiments, the elastomer is selected from the group comprising ethylene octene rubber (EOR) and ethylene butene monomer rubber (EBM), and mixture thereof. In some preferred embodiments, the elastomer is ethylene octene rubber (EOR), also referred to as $C_2$-$C_8$ copolymer. In some preferred embodiments, the elastomer is ethylene butene monomer rubber (EBM), also referred to as $C_2$-$C_4$ copolymer. Articles made of the present blend and comprising EOR or EBM show improved mechanical properties and improved coating suitability. For example, articles made of the present blend and comprising EOR or EBM show improved elongation at break.

In a preferred embodiment, the blend comprises at least 0.1% to at most 40.0% by weight of an elastomer, based on the total weight of the blend; preferably wherein the elastomer is selected from the group comprising: ethylene propylene rubber (EPR), ethylene propylene diene monomer rubber (EPDM), ethylene octene rubber (EOR), and ethylene butene monomer rubber (EBM), preferably wherein the elastomer is selected from ethylene octene rubber (EOR) and ethylene butene monomer rubber (EBM). In an embodiment, the blend comprises at least 0.2% by weight of an elastomer, for example at least 0.5% by weight of an elastomer, for example at least 1.0% by weight of an elastomer, for example at least 2.0% by weight of an elastomer, for example at least 5.0% by weight of an elastomer, based on the total weight of the blend, preferably at least 6.0% by weight of an elastomer, preferably at least 7.0% of an elastomer, preferably at least 7.5% by weight of an elastomer; preferably at least 8.0% by weight of an elastomer, preferably at least 8.5% by weight of an elastomer; preferably at least 9.0% by weight of an elastomer, preferably at least 10.0% by weight of an elastomer; preferably at least 11.0% by weight of an elastomer. In an embodiment, the blend comprises at most 35.0% by weight of an elastomer, for example most 30.0% by weight of an elastomer, for example at most 25.0% by weight of an elastomer, for example at most 20.0% by weight of an elastomer, for example at most 15.0% by weight of an elastomer, based on the total weight of the blend. In an embodiment, the blend comprises of from 0.2 to 35.0% by weight of an elastomer, for example of from 0.5 to 30.0% by weight of an elastomer, for example of from 1.0 to 25.0% by weight of an elastomer, for example of from 2.0 to 20.0% by weight of an elastomer, for example of from 5.0 to 15.0% by weight of an elastomer, based on the total weight of the blend. In some embodiments, the blend comprises of from 6.0 to 40.0% by weight of an elastomer, for example of from 7.0 to 30.0% by weight of an elastomer, for example of from 7.0 to 25.0% by weight of an elastomer, based on the total weight of the blend; preferably at least 8.0% to at most 40.0% by weight of an elastomer, for example at least 8.0% to at most 35.0% by weight of an elastomer, for example at least 8.0% to at most 30.0% by weight of an elastomer, preferably at least 8.0% and at most 25.0% by weight of an elastomer, based on the total weight of the blend; preferably at least 9.0% to at most 40.0% by weight of an elastomer, for example at least 9.0% to at most 35.0% by weight of an elastomer, for example at least 9.0% to at most 30.0% by weight of an elastomer, preferably at least 9.0% and at most 25.0% by weight of an elastomer, based on the total weight of the blend; for example at least 10.0% to at most 40.0% by weight of an elastomer, for example at least 10.0% to at most 35.0% by weight of an elastomer, for example at least 10.0% to at most 30.0% by weight of an elastomer, preferably at least 10.0% and at most 25.0% by weight of an elastomer, based on the total weight of the blend; for example at least 11.0% to at most 40.0% by weight of an elastomer, for example at least 11.0% to at most 35.0% by weight of an elastomer, for example at least 11.0% to at most 30.0% by weight of an elastomer, preferably at least 11.0% and at most 25.0% by weight of an elastomer, based on the total weight of the blend.

In an embodiment, the blend comprises at least 0.2% by weight of an elastomer, for example at least 0.5% by weight of an elastomer, for example at least 1.0% by weight of an elastomer, for example at least 2.0% by weight of an elastomer, for example at least 5.0% by weight of an elastomer, preferably at least 6.0% by weight of an elastomer, preferably at least 7.0% of an elastomer, preferably at least 8.0% by weight, preferably at least 9.0% by weight of an elastomer based on the total weight of the blend, wherein the elastomer is selected from ethylene octene rubber (EOR) and ethylene butene monomer rubber (EBM).

In an embodiment, the blend comprises at most 35.0% by weight of an elastomer, for example most 30.0% by weight of an elastomer, for example at most 25.0% by weight of an elastomer, for example at most 20.0% by weight of an elastomer, for example at most 15.0% by weight of an elastomer, based on the total weight of the blend, wherein the elastomer is selected from ethylene octene rubber (EOR) and ethylene butene monomer rubber (EBM). In an embodiment, the blend comprises of from 0.2 to 35.0% by weight of an elastomer, for example of from 0.5 to 30.0% by weight of an elastomer, for example of from 1.0 to 25.0% by weight of an elastomer, for example of from 2.0 to 20.0% by weight of an elastomer, for example of from 5.0 to 15.0% by weight of an elastomer, based on the total weight of the blend, wherein the elastomer is selected from ethylene octene rubber (EOR) and ethylene butene monomer rubber (EBM).

In some embodiments, the blend comprises of from 6.0 to 40.0% by weight of an elastomer, for example of from 7.0 to 30.0% by weight of an elastomer, for example of from 8.0 to 25.0% by weight of an elastomer, for example at least 9.0% to at most 40.0% by weight of an elastomer, for example at least 9.0% to at most 35.0% by weight of an elastomer, for example at least 9.0% to at most 30.0% by weight of an elastomer, preferably at least 9.0% and at most 25.0% by weight of an elastomer, based on the total weight of the blend; for example at least 10.0% to at most 40.0% by weight of an elastomer, for example at least 10.0% to at most 35.0% by weight of an elastomer, for example at least 10.0% to at most 30.0% by weight of an elastomer, preferably at least 10.0% and at most 25.0% by weight of an elastomer, based on the total weight of the blend; for example at least 11.0% to at most 40.0% by weight of an elastomer, for example at least 11.0% to at most 35.0% by weight of an elastomer, for example at least 11.0% to at most 30.0% by weight of an elastomer, preferably at least 11.0% and at most 25.0% by weight of an elastomer, based on the total weight of the blend; wherein the elastomer is selected from the group comprising ethylene octene rubber (EOR) and ethylene butene monomer rubber (EBM).

In an embodiment, the blend may also optionally comprise one or more additives to impart desired physical properties, such as printability, increased gloss, or a reduced blocking tendency of articles formed from a polymeric composition described herein. Examples of additives comprise, without limitation, stabilizers, ultra-violet screening agents, oxidants, anti-oxidants, anti-static agents, ultraviolet light absorbents, fire retardants, processing oils, mold release agents, coloring agents, pigments/dyes, fillers, and/or other suitable additives. The aforementioned additives may be used either singularly or in combination to form various formulations of the polymer. For example, in the fabrication of automotive parts, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to the polymeric compositions may be determined by one skilled in the art with the aid of this disclosure.

The present invention also encompasses a process of forming an article, comprising preparing a blend as described herein above and forming an article.

In some embodiments, the invention comprises providing a blend comprising:
- at least 5.0% to at most 20.0% by weight of polylactic acid, based on the total weight of the blend;
- at least 5.0% to at most 92.0% by weight of polypropylene or of a mixture of polypropylene and polyethylene, based on the total weight of the blend;
- from 0.0% to at most 40.0% by weight of an inorganic filler, based on the total weight of the blend; and
- at least 0.1% to at most 10.0% by weight of a compatibilizer, based on the total weight of the blend;

and forming an article using said blend.

In some embodiments, the polypropylene (or mixture of PP and PE) can be contacted with a polylactic acid (PLA) and a compatibilizer to form a compatibilized polymeric composition (which may also be referred to herein as a compatibilized blend or compatibilized blended material). Such contact may occur by a variety of methods. For example, such contact may comprise blending the polypropylene (or mixture of PP and PE) and the polylactic acid in the presence of the compatibilizer under conditions suitable for the formation of a blended material. Such blending may comprise dry blending, melt blending, melt compounding, or combinations thereof, by known blending techniques such as mixing and extrusion (e.g., twin-screw extrusion), for example.

The present process preferably comprises an extrusion process. As used herein, the terms "extrusion" or "extrusion process" are used herein as synonyms and refer to the process of transforming a polymer resin into a "polymer product". The process preferably comprises several equipments connected in series, including one or more rotating screws in an extruder, a die, and means for cutting the extruded filaments into pellets.

The extruder can have one or more heating means e.g. a jacket to heat the extruder barrels or a hot oil unit. The screw in the extruder can be the vehicle upon which the polyolefin product travels. The shape of the screw can determine, along with the speed at which the screw turns, expressed in rpm, the speed at which the product moves and the pressure attained in the extruder. The screw in the screw mixer can be powered by a motor, preferably an electric motor. In an embodiment, a plurality of extruders is used in series or parallel.

Preferably, the blend is processed at a temperature above the melt temperature, i.e., it is melt-processed. In a preferred embodiment, the process comprises the step of processing the blend at a temperature above the melt temperature of said blend; wherein this step preferably comprises extruding a mixture of the PLA, PP (or mixture of PP and PE) and compatibilizer in an extruder.

The melt temperature of the polymers can for example be determined by differential scanning calorimetry (DSC). The DSC can be performed with a Perkin-Elmer Pyris 1 equipment. In a typical DSC experiment, the sample is first heated up to 200° C. at a 20° C./min rate in order to fully melt the nanocomposite and remove its thermomechanical history. The sample is held at 200° C. during 3 min. Then the sample is cooled down to −40° C. at a 20° C./min rate and heated up again at 200° C. at 20° C./min. The melt temperature is measured during the second heating step and corresponds to the maximum of the melting peak. The standard used to calibrate the heating and cooling rate is Indium.

Said melt-processing step can for example be a pelletization, i.e. the production of pellets by melt-extruding, or can be a process selected from the group comprising injection molding, fiber extrusion, film extrusion, sheet extrusion, pipe extrusion, blow molding, rotomolding, slush molding, injection-stretch blow molding and extrusion-thermoforming. Most preferably, the melt-processing step involves injection molding.

In an embodiment, the blend is utilized in injection molding processes to form injection molded articles. The injection molded articles comprise a wide variety of articles, and for example comprise automotive parts or structures (e.g., automotive dashboard). The injection molded articles may be formed by any suitable injection molding process known to one of skill in the art. Injection molding processes generally comprise heating the polymeric composition to form a molten polymer and subsequently forcing (i.e., injecting) the molten polymer into a mold cavity where the molten polymer fills the mold cavity thereby taking the desired shape of the mold cavity. Thereafter, the molten polymer inside the mold cavity cools and hardens to form a molded article which is subsequently ejected from the mold.

In one example, polypropylene heterophasic copolymer, PLA, and an epoxy-functionalized polyolefin compatibilizer (e.g., HGGMA) may be dry blended, fed into an extruder, and melted inside the extruder. The mixing may be carried out using a mixer having an intermeshing co-rotating twin screw extruder for mixing and melting the components into a polymeric blend. The molten polymeric blend may be fed to a manifold where it is injected through nozzles into mold cavities. In each mold cavity, the molten blend fills the mold cavity, thereby taking on a desired shape of the interior of the mold cavity. The molten blend in the desired shape of the article cools and hardens to form an injection molded article which is subsequently ejected from the mold. In one example, the injection molded article is an automotive part such as an interior automotive part, for example.

In a preferred embodiment, the article is an automotive part. The automotive part may be a structural part, such as an interior or exterior part or structure of a vehicle, such as an automobile. Utilization of the blends described herein to form injection molded automotive parts advantageously provides automobile manufacturers with parts that be used to substitute parts traditionally made from metal, thereby permitting the fabrication of lighter more fuel efficient (i.e., eco-friendly) automobiles.

In a preferred embodiment, the article is an element for the exterior bodywork of a vehicle, preferably of a car or a truck. For example, the article may be a bumper.

According to a third aspect, the invention relates to a vehicle comprising the at least partially coated article according to the first aspect of the invention. Preferably, the vehicle comprises an automotive part as described above. Non-limiting examples of vehicles are cars, buses or trucks.

In an embodiment, the article described herein exhibits a tensile modulus of at least 1500 MPa, for example of at least 1800 MPa, as determined in accordance with ISO 527-2. In an embodiment, the article described herein exhibits a tensile modulus of at most 4500 MPa, for example of at most 4000 MPa, as determined in accordance with ISO 527-2. In an embodiment, the article described herein exhibits a tensile modulus of from 1500 to 4500 MPa, for example of from 1800 to 4000 MPa, as determined in accordance with ISO 527-2. The rigidity of the article can be reflected in the article's tensile modulus. The tensile modulus is the ratio of stress to elastic strain in tension. Therefore, the larger the tensile modulus the more rigid the material, and the more stress required to produce a given amount of strain.

In an embodiment, the article described herein exhibits a tensile yield strength of at least 18 MPa, for example of at least 20 MPa, as determined in accordance with ISO 527-2. In an embodiment, the article described herein exhibits a tensile yield strength of at most 35 MPa, for example of at most 30 MPa, as determined in accordance with ISO 527-2. In an embodiment, the article described herein exhibits a tensile yield strength of from 18 MPa to 35 MPa, for example of from 20 MPa to 30 MPa, as determined in accordance with ISO 527-2. The tensile strength at yield is the force per unit area required to yield a material.

In an embodiment, the article described herein exhibits a notched Izod impact strength at −20° C. of at least 1.0 kJ/m$^2$, for example of at least 1.5 kJ/m$^2$, for example of at least 2.0 kJ/m$^2$, as determined in accordance with ISO 180. In an embodiment, the article described herein exhibits a notched Izod impact strength at −20° C. of at most 15.0 kJ/m$^2$, for example of at most 10.0 kJ/m$^2$, for example of at most 5.0 kJ/m$^2$, as determined in accordance with ISO 180. In an embodiment, the article described herein exhibits a notched Izod impact strength at −20° C. of from 1.0 to 15.0 kJ/m$^2$, for example of from 1.5 to 10.0 kJ/m$^2$, for example of from 2.0 to 5.0 kJ/m$^2$, as determined in accordance with ISO 180. Izod impact is defined as the kinetic energy needed to initiate a fracture in a polymer sample specimen and continue the fracture until the specimen is broken. Tests of the Izod impact strength determine the resistance of a polymer sample to breakage by flexural shock as indicated by the energy expended from a pendulum type hammer in breaking a standard specimen in a single blow. The specimen is notched which serves to concentrate the stress and promote a brittle rather than ductile fracture. Specifically, the Izod impact test measures the amount of energy lost by the pendulum during the breakage of the test specimen. The energy lost by the pendulum is the sum of the energies required to initiate sample fracture, to propagate the fracture across the specimen, and any other energy loss associated with the measurement system (e.g., friction in the pendulum bearing, pendulum arm vibration, sample toss energy, etc.).

In an embodiment, the article described herein exhibits a CLTE (coefficient of linear thermal expansion) of at most $120 \times 10^{-6}$ m/m/K, for example of at most $80 \times 10^{-6}$ m/m/K, preferably of at most $65 \times 10^{-6}$, as determined in accordance with ASTM D696 between −20° C. and 100° C.

According to a fourth aspect, the invention relates to a process comprising the steps of:
preparing a blend comprising:
at least 5.0% to at most 20.0% by weight of polylactic acid, based on the total weight of the blend;
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend; and
at least 0.1% to at most 10.0% by weight of a compatibilizer, based on the total weight of the blend;
molding the blend into an article, preferably through injection molding; and
at least partially coating the article with at least one coating.

Preferably, the coating is applied directly on the blend. Preferably, the article is an injection-molded article. Preferably, the step of molding the blend into an article comprises the step of injection-molding the blend into an article. Preferably, the step of at least partially coating the article with at least one coating comprises the step of at least partially coating the blend with at least one coating. In a preferred embodiment, the process is free of any flaming step.

In an embodiment, the process comprises the following steps:
preparing a blend comprising:
at least 5.0% to at most 20.0% by weight of polylactic acid, based on the total weight of the blend; and
a composition, wherein the composition comprises:
at least 5.0% to at most 92.0% by weight of polypropylene or of a mixture of polypropylene and polyethylene, based on the total weight of the blend;
from 0.0% to at most 40.0% by weight of an inorganic filler, based on the total weight of the blend; and
at least 0.1% to at most 10.0% by weight of a compatibilizer, based on the total weight of the blend;
molding the blend into an article; and
at least partially coating the article with at least one coating.

Preferably, the coating is applied directly on the blend. Preferably, the article is an injection-molded article. Preferably, the step of molding the blend into an article comprises the step of injection-molding the blend into an article. Preferably, the step of at least partially coating the article with at least one coating comprises the step of at least partially coating the blend with at least one coating. In a preferred embodiment, the process is free of any flaming step.

In an embodiment, the process comprises extrusion of the blend, for example at a temperature of at least 170° C., for example at least 180° C., for example of at most and 240° C., for example of at most 210° C. In an embodiment, the extrusion of the blend is performed at a temperature of from 170° C. to 240° C., for example of from 180° C. to 210° C.

Preferably, the molded article according to the first aspect of the invention is formed through a process according to the fourth aspect of the invention. Preferred embodiments for the processes described above are as described above for the article.

The processes and articles according to the invention are illustrated by the following examples.

Examples

Test Methods

The paint blistering grade was evaluated as resistance to immersion in water, by determining the density of blistering after a period of immersion in de-ionized water. The samples were immersed in a FORD tank at 40° C. for 240 hours. The coated surface of the plate was at least 1 dm$^3$.

Prior to immersion, the specimens were conditioned at 23° C.±2° C. and 50%±5% relative humidity for at least 1 day. Subsequently, the tank was filled with de-ionized water and set to its operating conditions of 40° C.±1° C., and the samples were introduced in the tank for 240 hours. The samples were then lifted out of the tank, wiped gently, and left to dry for 1 hour at 23° C.±2° C. and 50%±5% relative humidity. The grading of the blistering was made using a series of 16 photographs originating from the norm ASTM D714, according to the following scale:

0—Only micro-blistering or very slight loss of gloss or slight change in color reversible by slight rubbing with a cloth less than 6 hours after the end of the test.

1—Loss of gloss or non-reversible change of color at least 6 hours after the end of the test.

2—Sizes and densities other than those above.

3—Sizes and densities other than those above.

4—More significant degradation than above.

The adhesion test was performed after the immersion test as described above, to assess the resistance of a paint coating system to separation from its substrate when incisions are made as far as the substrate.

The adhesion test consisted of making at least 6 incisions in each direction in the paint film as far as the substrate using a cutting instrument to form a cross hatch (illustrated in FIG. 1), then assessing the adhesion of the squares on the network formed. This test was completed by a tear test carried out using adhesive tape on the cross hatched part of the film, the results of which were compared with a reference film, as shown in FIG. 1.

The spacing between two scratches was 2 mm. A Craft knife single blade was used. A 3M 2525 adhesive tape (adhesion between 600 and 750 g/cm conform with standard NF EN 1939) was used. ISO 2409 scratch testers were used. The test was carried out in three different places on the samples.

The centre of the adhesive tape was placed on the cross hatched area, in parallel with one of the directions of incision. The tape was firmly pressed with the finger on the cross hatched area and, around over a length of at least 20 mm, smoothed with a wooden rounded ridge tool. At least 1 minute was allowed for adhesion. Within five minutes following the application of the adhesive tape, the tape was removed by holding the free extremity and rapidly tearing it in 0.5 second to 1 second, at an angle as close as possible to 60°. The paint film was examined and classified according to the size of the detached area by comparing it with FIG. 1, for each of the three different places per sample.

Sample Preparation

Comparative Example 0 and Examples 1-4 were prepared by blending the components listed in Table 1. Polypropylene heterophasic copolymer (PPHC, ethylene content of 8 wt. %) was used. Ethylene butene monomer rubber (EBM) was used as elastomer. For the polylactic acid, a polylactic acid with an MI$_2$ of 15.0-30.0 g/10 min (ASTM D1238, 210° C. at a load of 2.16 kg) and a specific gravity of 1.24 g/cm$^3$ (ASTM D792) was used.

The compatibilizer was a commercially available highly grafted PP-g-GMA.

The talc used in the examples had a high aspect ratio with a D50 (as measured with a Malvern 2000 diffractometer) of 11.0 μm and a D90 of 26.5 μm, commercially available under the trade name HAR® talcs from Imerys S.A.

TABLE 1

|  | Example 0 | Example 1 | Example 2 | Example 3 | Example 4 |
| --- | --- | --- | --- | --- | --- |
| PPHC (wt %) | 57 | 52 | 49 | 42 | 32 |
| EBM (wt %) | 13 | 13 | 13 | 13 | 13 |
| Talc (wt %) | 30 | 30 | 30 | 30 | 30 |
| PLA (wt %) | 0 | 5 | 5 | 10 | 20 |
| Compatibilizer (wt %) | 0 | 0 | 3 | 5 | 5 |
| Total | 100 | 100 | 100 | 100 | 100 |

Samples for Comparative Example 0 (composition A without PLA and without compatibilizer) and Examples 1-4 were prepared by blending the components in an extruder and by injection molding them into a plate. The extruder was a co-rotating twin screw extruder with a screw diameter of 26 mm and a L/D ratio of 44. Raw materials were introduced via the main feeder in Z1. The temperature profile and screw parameters are shown in Table 2 and Table 3.

TABLE 2

| T (° C.) | | | | | | | | | | | |
| --- | --- | --- | --- | --- | --- | --- | --- | --- | --- | --- | --- |
|  | Z1 | Z2 | Z3 | Z4 | Z5 | Z6 | Z7 | Z8 | Z9 | Z10 | Die |
| Set | 200 | 200 | 200 | 200 | 200 | 200 | 200 | 200 | 200 | 200 | 200 |
| Actual | 200 | 200 | 200 | 201 | 200 | 200 | 200 | 200 | 199 | 200 | 205 |
| Melt | x | 189 | x | 200 | x | 200 | x | 201 | x | x | 195 |

TABLE 3

| Samples | 302X008 |
| --- | --- |
| Pressure (bar) | 31 |
| Torque (%) | 60 |
| Screw speed (rpm) | 325/345 |
| Extrusion speed (m/min) | 29.2 |
| Throughput (kg/h) | 25 |

The samples were subsequently painted. One half of each plate was flamed prior to painting, and the other half was painted directly onto the blend.

For the flaming step, the following parameters were used:
The distance between the burner and the plates was 120 mm.
The burner was moved parallel to the plates with a velocity of 450 mm/s.
The flaming step used a combination of air and commercial propane, with a volumetric flow rate of 480 l/min air and 59.2 l/min gas.

All plates were painted with a three layer paint system:
1. solvent primer: "gris ardoise, conducteur", commercially available from Wörwag.
2. solvent basecoat: "noir obsidien PSA EXL", available from Wörwag
3. solvent clearcoat: commercially available from Wörwag.

Results for Comparative Example 0 and Examples 1-4 are shown in Table 4.

TABLE 4

| | Example 0 | Example 1 | Example 2 | Example 3 | Example 4 |
|---|---|---|---|---|---|
| MFI$_2$ at 230° C. (g/10 min) under a 2.16 kg load ISO 1133 | 11.6 | 11.2 | 9.7 | 8.6 | 8 |
| shrinkage | 0.37 | 0.37 | 0.33 | 0.31 | 0.3 |
| CLTE (m/m/K) ASTM D696 | 41.5 | 43.1 | 40.1 | 33.1 | 33 |
| Flexural modulus (MPa) ISO 178 | 2749 | 2961 | 3204 | 3360 | 3672 |
| Tensile Modulus (MPa) ISO 527-2 | 2636 | 2848 | 2944 | 3085 | 3376 |
| Stress (MPa) @ Yield ISO 527-2 | 22 | 21 | 24.1 | 24.1 | 24.9 |
| Strain (%) @ Yield ISO 527-2 | 3 | 2.4 | 2.7 | 2.4 | 1.9 |
| Elongation (%) @ Break traverse ISO 527-2 | 29 | 19.7 | 29.7 | 23 | 15.3 |
| Cut-notched Charpy (kJ/m$^2$) @ −20° C. ISO 180 | 2.8 | 1.6 | 2.7 | 1.9 | 1.7 |
| With flaming PSA D271327 | | | | | |
| Blistering grade | 1 | 2 | 1 | 1 | 1 |
| Adhesion test | a/a/a | a/a/a | a/a/a | a/a/a | a/a/a |
| Without flaming PSA D271327 | | | | | |
| Blistering grade | 3 | 2 | 3 | 2 | 2 |
| Adhesion test | d/a/a | ≥e/e/e | ≥e/e/c | a/a/a | a/a/a |

The invention claimed is:

1. A coated article comprising an article having an unflamed surface, which is at least partially coated with at least one coating, wherein at least one of the at least one coating is directly applied to the unflamed surface, and wherein the article having the unflamed surface comprises a blend comprising:
at least 5.0% to at most 20.0% by weight of polylactic acid, based on a total weight of the blend;
at least 5.0% to at most 79.8% by weight of polypropylene or of a mixture of polypropylene and polyethylene, based on the total weight of the blend;
at least 15.0% to at most 40.0% by weight of an inorganic filler, based on the total weight of the blend;
at least 0.1% to at most 10.0% by weight of a compatibilizer, based on the total weight of the blend; and
at least 0.1% to at most 40.0% by weight of an elastomer, based on the total weight of the blend, wherein the elastomer is selected from the group consisting of ethylene octene rubber and ethylene butene monomer rubber.

2. The coated article according to claim 1, wherein said article is an injection molded article.

3. The coated article according to claim 1, wherein the at least one coating is selected from the group consisting of: a paint, a varnish, an adhesive, a lacquer, and combinations thereof.

4. The coated article according to claim 1, wherein the blend comprises at least 7.0% to at most 13.0% by weight of polylactic acid, based on the total weight of the blend.

5. The coated article according to claim 1, wherein the elastomer is present in a concentration ranging from 7.0 to 25.0% by weight based on the total weight of the blend.

6. The coated article according to claim 1, wherein the inorganic filler comprises talc.

7. The coated article according to claim 1, wherein the polypropylene or the mixture of polypropylene and polyethylene has a melt index MI$_2$ of at least 4.0 g/10 min and at most 100.0 g/10 min, as determined at 230° C. under a 2.16 kg load in accordance with ISO 1133.

8. The coated article according to claim 1, wherein the polylactic acid has a melt index MI$_2$ of at least 10.0 g/10 min and at most 80.0 g/10 min, as determined at 210° C. under a 2.16 kg load in accordance with ASTM D1238.

9. The coated article according to claim 1, wherein the compatibilizer comprises an epoxy-functionalized polyolefin or a co- or a ter-polymer comprising:
(a) 50.0 to 99.9 wt % of ethylene or styrene monomer;
(b) 0.1 to 50.0 wt % of an unsaturated anhydride-, epoxide- or carboxylic acid-containing monomer; and
(c) 0.0 to 50.0 wt % of a (meth)acrylic ester monomer.

10. The coated article according to claim 1, wherein the coated article is an automotive part.

11. A vehicle comprising the automotive part according to claim 10.

12. The coated article of claim 1, wherein the blend comprises 5.0% to at most 9.0% by weight of polylactic acid, based on a total weight of the blend.

13. A coated article obtained by a process comprising the steps of:
preparing a blend;
molding the blend into an article: and
at least partially coating a surface of the article with at least one coating, wherein at least one of the at least one coating is directly applied to the surface, which is unflamed prior to coating, and wherein the blend comprises:
at least 5.0% to at most 20.0% by weight of polylactic acid, based on a total weight of the blend;
at least 5.0% to at most 79.8% by weight of polypropylene or of a mixture of polypropylene and polyethylene, based on the total weight of the blend;
at least 15.0% to at most 40.0% by weight of an inorganic filler, based on the total weight of the blend;
at least 0.1% to at most 10.0% by weight of a compatibilizer, based on the total weight of the blend; and
at least 0.1% to at most 40.0% by weight of an elastomer, based on the total weight of the blend, wherein the elastomer is selected from the group consisting of ethylene octene rubber and ethylene butene monomer rubber.

14. The coated article of claim 13, wherein the blend comprises 5.0% to at most 9.0% by weight of polylactic acid, based on a total weight of the blend.

15. A process for forming a coated article, the process comprising the steps of:

preparing a blend;

molding the blend into an article: and at least partially coating a surface of the article with at least one coating, wherein at least one of the at least one coating is directly applied to the surface, which is unflamed prior to coating, and wherein the blend comprises:

at least 5.0% to at most 20.0% by weight of polylactic acid, based on a total weight of the blend;

at least 5.0% to at most 79.8% by weight of polypropylene or of a mixture of polypropylene and polyethylene, based on the total weight of the blend;

at least 15.0% to at most 40.0% by weight of an inorganic filler, based on the total weight of the blend;

at least 0.1% to at most 10.0% by weight of a compatibilizer, based on the total weight of the blend; and at least 0.1% to at most 40.0% by weight of an elastomer, based on the total weight of the blend, wherein the elastomer is selected from the group comprising of ethylene octene rubber and ethylene butene monomer rubber.

16. The process of claim 15, wherein the blend comprises 5.0% to at most 9.0% by weight of polylactic acid, based on a total weight of the blend.

\* \* \* \* \*